United States Patent
Lang et al.

(10) Patent No.: US 10,067,234 B2
(45) Date of Patent: Sep. 4, 2018

(54) PROJECTED BEAM DETECTOR WITH IMAGING DEVICE

(71) Applicant: Honeywell International Inc., Morristown, NJ (US)

(72) Inventors: Scott Robert Lang, Geneva, IL (US); Mark C. Bohanon, Aurora, IL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 515 days.

(21) Appl. No.: 14/623,778

(22) Filed: Feb. 17, 2015

(65) Prior Publication Data

US 2016/0238709 A1    Aug. 18, 2016

(51) Int. Cl.
| | |
|---|---|
| *G01S 17/88* | (2006.01) |
| *G01S 17/08* | (2006.01) |
| *G08B 17/103* | (2006.01) |
| *G08B 17/12* | (2006.01) |

(52) U.S. Cl.
CPC ............. *G01S 17/88* (2013.01); *G01S 17/08* (2013.01); *G08B 17/103* (2013.01); *G08B 17/125* (2013.01)

(58) Field of Classification Search
CPC ............................. G01C 15/002; G01C 15/00
See application file for complete search history.

(56) References Cited

U.S. PATENT DOCUMENTS

| | | | |
|---|---|---|---|
| 6,675,122 B1* | 1/2004 | Markendorf | G01C 15/002 356/614 |
| 7,760,359 B2 | 7/2010 | Hawkinson et al. | |
| 8,704,670 B2 | 4/2014 | Au et al. | |
| 8,804,119 B2 | 8/2014 | Knox et al. | |
| 2004/0101163 A1* | 5/2004 | Kumagai | G01C 15/002 382/103 |
| 2009/0147261 A1 | 6/2009 | Hawkinson et al. | |
| 2011/0221889 A1* | 9/2011 | Knox | G01N 21/53 348/135 |

FOREIGN PATENT DOCUMENTS

| | | |
|---|---|---|
| EP | 2 562 734 A1 | 2/2013 |
| WO | WO 2009/144707 A1 | 12/2009 |

OTHER PUBLICATIONS

The extended European search report from corresponding EP patent application 16154952.2, dated Jul. 5, 2016.

* cited by examiner

*Primary Examiner* — Luke D Ratcliffe
(74) *Attorney, Agent, or Firm* — Husch Blackwell LLP

(57) ABSTRACT

A method of installing a projected beam detector can include providing a radiant energy source, providing a reflector, and projecting a radiant energy beam from the source to the reflector. A multi-pixel sensor or camera can be provided. The beam can be reflected from the reflector back to the sensor. A distance between the reflector and the camera can be determined based on a size of an image of the reflector incident on the camera. Where incident intensity corresponds to expected intensity for a predetermined distance, a sensitivity can be set based on the predetermined distance.

10 Claims, 4 Drawing Sheets

PROJECTED BEAM DETECTOR WITH IMAGING DEVICE

FIELD

The application pertains to projected beam smoke detectors. More particularly, the application pertains to such detectors that include image sensors to facilitate installation and maintenance of such detectors.

BACKGROUND

Existing projected beam smoke detectors can be difficult to install and align. Many times when such a detector is installed, a technician believes that an installation has been done correctly, and the detector indicates no trouble conditions. However, later, any slight movement of the detector will cause a trouble condition. This is because the detector's beam was not centered properly on the detector's reflector.

At installation or when subsequently providing maintenance to the detector, it is often necessary for the technician to know a distance across a projected space in order to properly set a sensitivity. Currently, the technician must independently measure the distance in some way or read the distance from drawings of a building. Once the distance is known, a proper sensitivity setting can be selected on the detector.

One known approach to addressing the above noted problem has been disclosed in U.S. Pat. No. 7,760,359 (the '359 patent), which issued Jul. 20, 2010, is entitled "Beam Detector Distance Measurement," and is assigned to the assignee hereof. The '359 patent is hereby incorporated by reference. In the '359 patent, the distance the beam travels between the detector's transmitter and the detector's receiver is measured. A sensitivity parameter of the detector could be set in response to results of that measurement.

DETAILED DESCRIPTION

Figure 1:
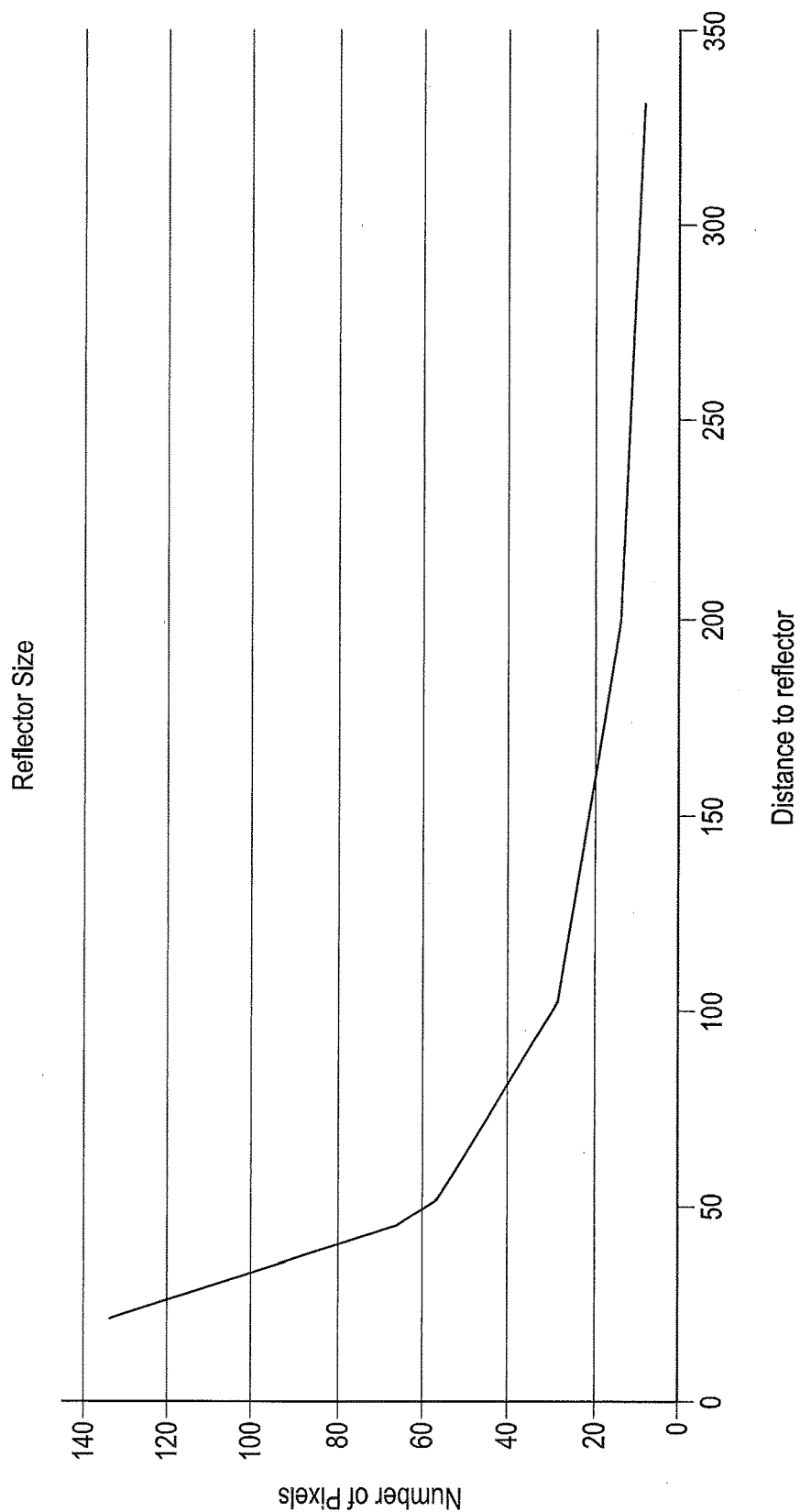
FIG. 1 is a graph of exemplary size of a received image of a reflector in pixels vs. distance for a predetermined reflector size.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

In embodiments hereof, projected beam detectors can automatically measure a distance across a projected space and set themselves accordingly. Such detectors can incorporate a multi-pixel image sensor or camera. In accordance herewith, a beam alignment problem can be solved, in part, by comparing a received signal level during installation and alignment to a known table of values.

In one aspect, a projected beam smoke detector can incorporate a CMOS camera. A reflector is provided displaced from the detector. The distance across the projected space can be ascertained by determining a number of pixels that the reflector occupies in a field of view of the camera. The reflector has a known size, and as the distance between the detector and the reflector decreases, the size of the reflector increases on such an imaging device.

For example, as illustrated in FIG. 1, reasonable resolution in a distance measurement can be obtained in a detector with a CMOS camera having 0.5 Mpixel resolution and an 8 inch reflector. The resolution is limited by how much a distance must change in order to result in a one pixel change in an apparent size of the reflector. A change from 330 feet to 300 feet will change the size by one pixel. The resolution improves as the distance decreases.

Figure 2:
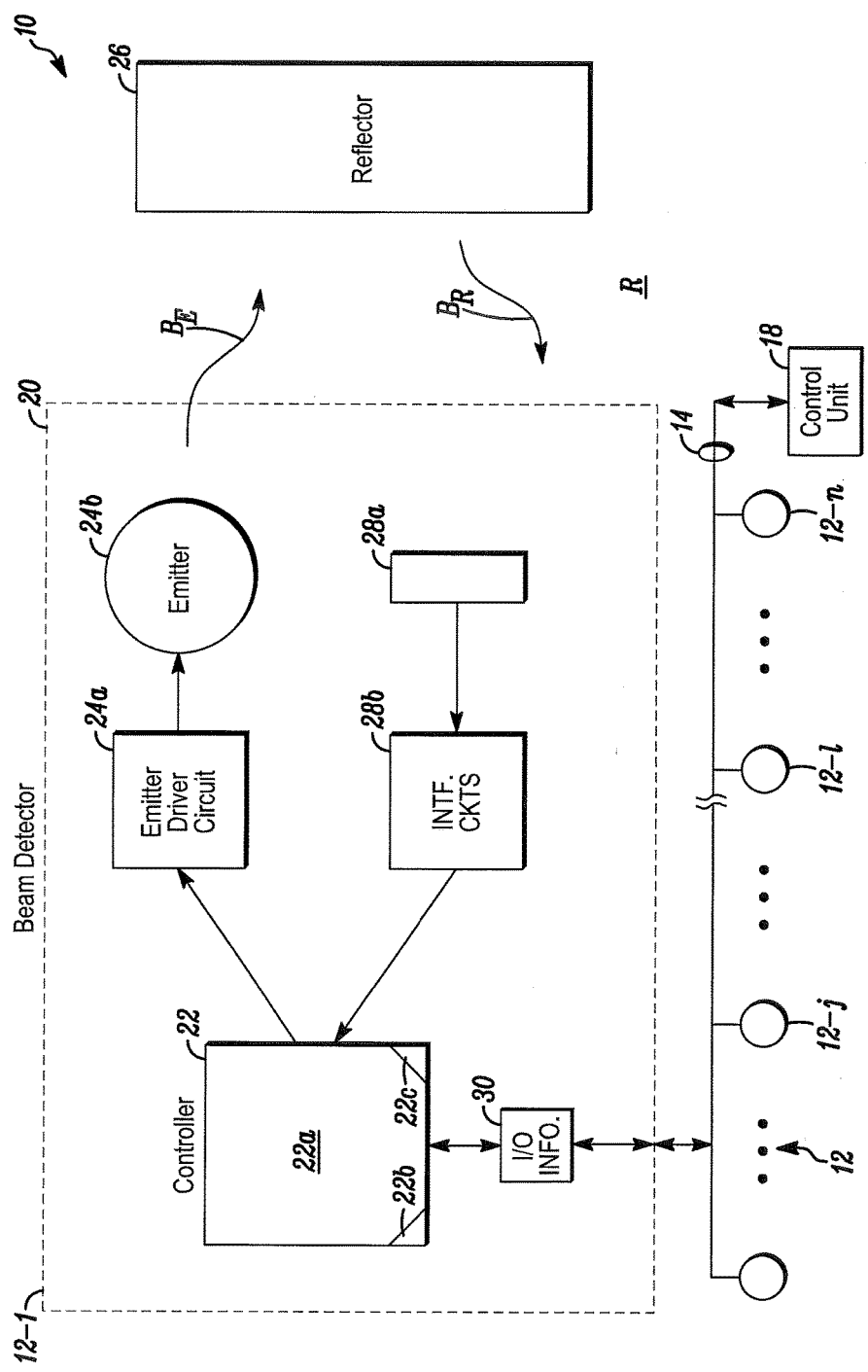
FIG. 2 is a block diagram of a system in accordance herewith.

FIG. 2 illustrates a diagram of a system 10 with a projected beam detector in accordance herewith. The system 10 includes a plurality 12 of ambient condition detectors 12-1 ... 12-n. Members of the plurality 12 are coupled by a medium 14 that could be, in part, wired and/or wireless, all without limitation, to a regional monitoring control unit 18. The members of the plurality 12 could include smoke detectors, heat detectors, fire detectors, and gas detectors, all without limitation.

Such a regional monitoring system 12, 14, 18 could be installed and configured as those of skill will understand so as to monitor ambient conditions at a plurality of locations in a region R. For example, the unit 18 could be configured so as to monitor the region R for fire, smoke, or gas conditions, all without limitation.

An exemplary detector 12-1 could be implemented as a projected beam smoke detector with a housing 20 that carries a programmable controller 22. The controller 22 could include hard wired circuitry 22a, one or more programmable processor(s) 22b, and executable control software 22c encoded on a computer readable medium, such as a semi-conductor, magnetic, or optical storage. The processor(s) 22b could execute the software 22c to carry out one or more methods as described subsequently.

The controller 22 is also coupled to emitter drive circuitry 24a. The circuitry 24a is, in turn, coupled to a source or emitter 24b of a beam of radiant energy BE. For example, the emitter 24b could be implemented as a laser, laser diode, or LED so as to emit mono-chromatic light.

A reflector 26 is displaced from the detector 12-1 and positioned so that the beam BE reflects therefrom as beam BR and returns to the housing 20. The beam BR is incident on a CMOS camera or imaging sensor 28a. The camera 28a is coupled to interface detector circuitry 28b. The circuitry 28b couples one or more signals indicative of an image sensed by the camera 28a to the controller 22.

Figure 3:
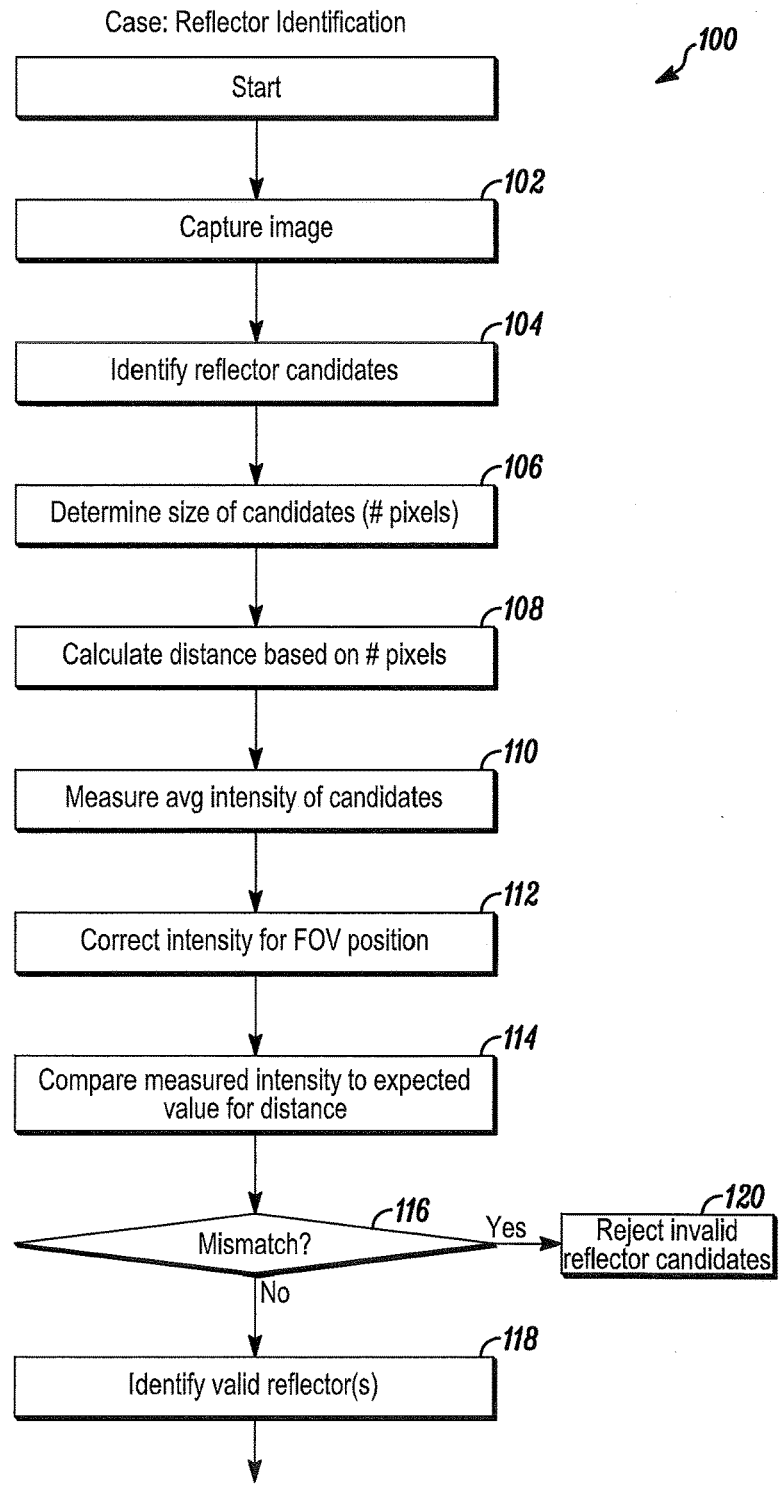
FIG. 3 is a flow chart illustrating aspects of a method in accordance herewith.
Figure 4:
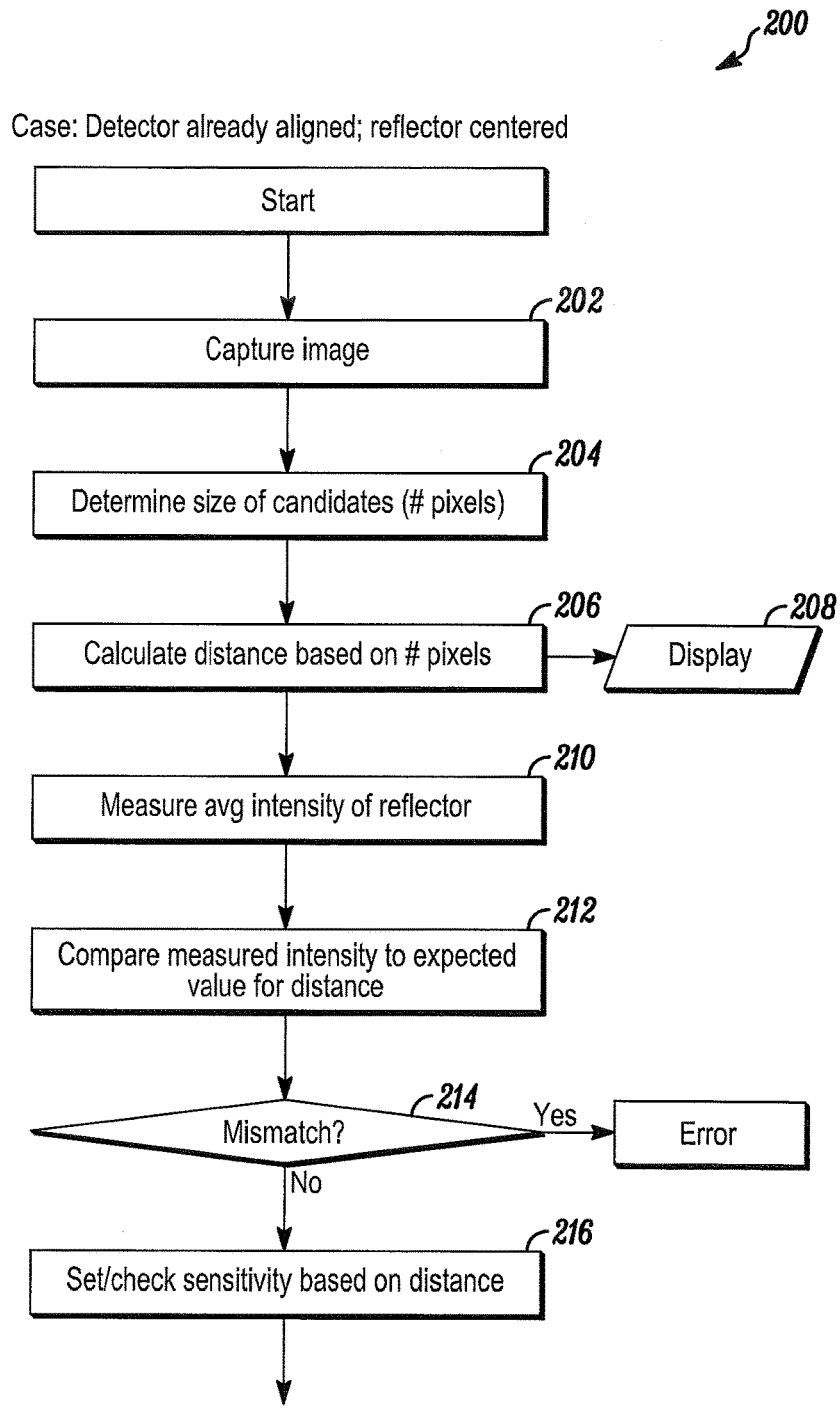
FIG. 4 is a flow chart illustrating further aspects of a method in accordance herewith.

FIGS. 3 and 4 illustrate aspects of methods 100, 200 that can be implemented by a detector, such as the detector 20 of FIG. 2. Reflector identification can be implemented in accordance with the method 100 when the image of the reflector 26 is detected on the camera 28a, as discussed above. As a result of flashing the emitter 24b, the image can be captured, as at 102. The image might include one or more bright spots indicative of objects in a field of view (FOV) of the camera 28a.

Subsequently, as at 104, reflector candidates in the FOV can be identified. A size (expressed in number of pixels on the camera 28a) of the candidates can be determined, as at 106. For each of the candidates, a distance between the reflector 26 and the image on the camera 28a can be determined, as at 108, via a graph as in FIG. 1 since both the size of the reflector and the number of pixels on the image of the camera 28a for each of the candidates are known.

An average intensity of each of the candidates can be determined, as at 110. The average intensity of each of the candidates in the field of view can be corrected to take into account the image's location in the FOV of the camera 28a, as at 112, using a pre-stored table of expected brightness vs. distance. For example, when the LED or source illuminates the camera, an expected intensity may not be received due to the location of the candidates in the FOV.

Measured intensity can be compared to an expected value for a given distance between the reflector 26 and the camera 28a, as at 114. If there is no mismatch, as at 116, a valid reflector(s) can be identified, as at 118. In the event of a mismatch, that candidate can be rejected, as at 120. Images from an identified reflector can be used subsequently in detecting a presence of smoke in the region being monitored.

Sensitivity can be checked or set in connection with aligned detectors with centered reflectors in accordance with the method 200 of FIG. 4. With respect to the method 200, the image of the reflector can be captured, as at 202. The size of the reflector in pixels can be determined, as at 204.

The distance between the reflector and the camera 28a can be determined, as at 206. Optionally, a display thereof can be provided, as at 208.

The average intensity of the pixels of the reflector can be determined, as at 210. The measured intensity can be compared to the expected value for the distance determined, as at 212. Where there is no mismatch, as at 214, the sensitivity of the detector can be set or verified, as at 216.

Advantageously, as discussed above, the average intensity of the pixels of the camera 28a should fall within an expected range for a given distance. If they do not, then an error or trouble indicator can be generated or produced. Also, the size of the reflector 26 on the camera 28a can be periodically checked and should remain constant over time. In a test mode, the image from the reflector may be partially blocked. Accidental blockages can also be detected.

Different sensitivities can be established for multiple reflectors within a field of view at different distances. In this regard, a first sensitivity can be established for a reflector in a foreground, and a different sensitivity can be established for a reflector in a background.

Sensitivity can be set based on distance. This can be useful where there are requirements for predetermined sensitivities for predetermined distances.

Reflector images can be qualified using size vs. signal strength. The reflector images can be tracked over time to detect movement due to a building settling or other anomalies.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A projected beam detector comprising:
   a source of a beam of radiant energy;
   a first reflector; and
   control circuits including a multi-pixel sensor of the radiant energy that captures a first image,
   wherein a first portion of the first image includes the first reflector,
   wherein the beam of the radiant energy is reflected to the multi-pixel sensor, and
   wherein the control circuits determine a first distance between the first reflector and the multi-pixel sensor by comparing a first known size of the first reflector to a first number of first pixels occupied by the first portion of the first image that includes the first reflector, measure a first intensity of the radiant energy in the first portion of the first image that includes the first reflector, and verify a first validity of the first reflector by comparing the first intensity of the radiant energy in the first portion of the first image that includes the first reflector to a first expected value for the first intensity corresponding to the first distance.

2. The projected beam detector as in claim 1 wherein visual feedback facilitates alignment of the beam of the radiant energy and the first reflector.

3. The projected beam detector as in claim 1 further comprising:
   a second reflector,
   wherein the multi-pixel sensor captures a second image,
   wherein a second portion of the second image includes the second reflector, and
   wherein the control circuits determine a second distance between the second reflector and the multi-pixel sensor by comparing a second known size of the second reflector to a second number of second pixels occupied by the second portion of the second image that includes the second reflector, measure a second intensity of the radiant energy in the second portion of the second image that includes the second reflector, and verify a second validity of the second reflector by comparing the second intensity of the radiant energy in the second portion of the second image that includes the second reflector to a second expected value for the second intensity corresponding to the second distance.

4. A method comprising:
   providing a radiant energy source;
   providing a first reflector;
   projecting a radiant energy beam from the radiant energy source to the first reflector;
   providing a multi-pixel sensor;
   reflecting the radiant energy beam from the first reflector to the multi-pixel sensor;
   the multi-pixel sensor capturing an image including a portion that includes the first reflector;
   control circuits coupled to the multi-pixel sensor determining a first distance between the first reflector and the multi-pixel sensor by comparing a known size of the first reflector to a number of pixels occupied by the portion of the image that includes the first reflector;
   the control circuits measuring a first intensity of the radiant energy beam in the portion of the image that includes the first reflector; and
   the control circuits verifying a validity of the first reflector by comparing the first intensity of the radiant energy beam in the portion of the image that includes the first reflector to an expected value for the first intensity corresponding to the first distance.

5. The method as in claim 4 further comprising moving one of the first reflector or the multi-pixel sensor to adjust the image.

6. The method as in claim 4 further comprising centering the radiant energy beam on the multi-pixel sensor.

7. The method as in claim 4 wherein the first intensity is an average intensity of the radiant energy beam in the portion of the image that includes the first reflector.

8. The method as in claim 4 further comprising the control circuits setting a sensitivity based on a result of comparing the first intensity of the radiant energy beam in the portion of the image that includes the first reflector to be expected value for the first intensity corresponding to the first distance.

9. The method as in claim 4 further comprising:
   providing a display device having a rectangular, multi-pixel display surface; and
   displaying the image.

10. The method as in claim 4 further comprising providing a second reflector at a second distance from the multi-pixel sensor to establish multiple sensitivities.

* * * * *